United States Patent [19]

Hardwick et al.

[11] 4,182,627

[45] Jan. 8, 1980

[54] BALLS CONTAINING TUNGSTEN CARBIDE

[75] Inventors: William H. Hardwick, Didcot; Peter F. Wace, Littlemore; Peter J. Alder, Wantage, all of England

[73] Assignee: National Research Development Corporation, London, England

[21] Appl. No.: 944,654

[22] Filed: Sep. 21, 1978

[30] Foreign Application Priority Data

Sep. 26, 1977 [GB] United Kingdom ............... 40049/77

[51] Int. Cl.$^2$ ............................ B22F 5/00; B22F 7/06
[52] U.S. Cl. ............................ 75/0.5 AC; 75/0.5 BC; 75/204; 75/252; 401/215
[58] Field of Search ............ 75/0.5 BC, 0.5 AC, 252, 75/204; 401/215

[56] References Cited

U.S. PATENT DOCUMENTS

| | | | |
|---|---|---|---|
| 3,617,358 | 11/1971 | Dittrich | 75/252 |
| 3,628,921 | 12/1971 | Hill | 75/204 |
| 3,746,456 | 7/1973 | Hill | 75/204 |
| 4,025,334 | 5/1977 | Cheney et al. | 75/0.5 AC |

FOREIGN PATENT DOCUMENTS

| | | |
|---|---|---|
| 2714139 | 10/1977 | Fed. Rep. of Germany . |
| 1175834 | 12/1969 | United Kingdom . |
| 1231385 | 5/1971 | United Kingdom . |
| 1253807 | 11/1971 | United Kingdom . |
| 1277420 | 6/1972 | United Kingdom . |
| 1313750 | 4/1973 | United Kingdom . |
| 1363532 | 8/1974 | United Kingdom . |
| 1395486 | 5/1975 | United Kingdom . |
| 1401962 | 8/1975 | United Kingdom . |

Primary Examiner—W. Stallard
Attorney, Agent, or Firm—Cushman, Darby & Cushman

[57] ABSTRACT

A process for producing balls of cobalt containing tungsten carbide, the process comprising forming droplets of a liquid mixture comprising: particles of tungsten carbide; guar gum; a dissolved cobalt salt; and a non-ionic wetting agent; contacting the droplets for not more than 1 hour with a base to precipitate a cobalt species, thereby forming droplets of a gel precipitate, placing the droplets of the gel precipitate in a vessel having a thermal conductivity not exceeding 100 cal/sec/cm$^2$, and heating the vessel in a reducing atmosphere to remove the guar gum and to sinter the tungsten carbide and cobalt, thereby forming sintered balls of cobalt containing tungsten carbide.

7 Claims, No Drawings

BALLS CONTAINING TUNGSTEN CARBIDE

The present invention relates to balls containing tungsten carbide.

According to one aspect of the present invention there is provided a process for the production of balls of an inorganic material containing tugsten carbide. The process comprises forming droplets of a gel precipitate by a gel precipitation process, the precipitate comprising an organic polymeric substance, particles of tungsten carbide and a precipitated form of an inorganic species, and heating the gel precipitate to remove the organic substance thereby to give balls of an inorganic material containing tungsten carbide.

By "a gel precipitation process" we mean a process which involves the use of an organic gelling agent and it will be appreciated that the said organic substance in the gel precipitate can comprise a precipitated form of the organic gelling agent.

We prefer that the gel precipitate is prepared by contacting a droplet of a liquid mixture comprising particles of tungsten carbide, an organic gelling agent, and a solution of a compound of the inorganic species with a precipitating agent capable of converting the liquid mixture into a gel precipitate.

It will be appreciated that in accordance with the present invention the inorganic species (e.g. cobalt) is one which is capable of producing, together with the organic substance, a gel precipitate.

Briefly, in the production of a gel precipitate by one form of gel precipitation process (sometimes called "forward" gel precipitation) a feed solution containing an inorganic species, such as an element or a compound of an element (the element typically being a metal), in the form of either a salt solution or a sol, and organic gelling agent (gelating agent), or agents, is formed into droplets and introduced into a precipitating agent to give droplets of a gel precipitate containing the inorganic species and the gelling agent in intimate association. British Patent Specification Nos. 1,175,834, 1,231,385, 1,253,807, 1,313,750, 1,363,532 and 1,277,420 relate to gel precipitation processes and reference may be made to these for information regarding such processes. British Patent Specification No. 1,313,750 discloses "modifying agents" which can be used in gel precipitating processes including the present invention. British Specification No. 1,401,962 discloses how the spherical shape of the droplets may be preserved when the droplet is introduced into the precipitating agent, and that disclosure may be used in this invention. Alkyl aryl sulphonic acid in a concentration of 0.1% to 0.5% is preferably used, to form the cushioning layer of foam through which the droplets are dropped into the precipitating agent. Other chemicals may have adverse effects.

(It will be appreciated that generally the inorganic species and the organic gelling agent interact (e.g. by complex formation) to produce the gel precipitated gel (i.e. gel precipitate) and it will be understood that in the gel precipitate the inorganic species will generally be present in the form of a compound rather than as a free element. Further, it will be appreciated that a plurality of inorganic species (e.g. elements) may be present in the gel precipitate).

The organic gelling agent enables the feed solution to gel in a coherent manner in the presence of the precipitating agent. Not any gelling organic agent is suitable as the organic polymeric substance to be removed by heating, since some react with the dissolved inorganic species, and some form weak balls. We have found that guar gum is preferable.

Where the precipitating agent is a base such as ammonium hydroxide or sodium hydroxide the inorganic species will generally be present in the gel precipitate in the form of an oxide, hydrous oxide or hydroxide of an element, or a mixture thereof.

In one preferred embodiment of the invention the liquid mixture comprises tungsten carbide powder, aqueous cobalt nitrate solution and an organic gelling agent, and the gel precipitate can be formed by contacting droplets of the liquid mixture with a base such that the gel precipitate formed contains tungsten carbide particles, cobalt hydroxide and organic gelling agent. The gel precipitate can subsequently be be heated, (e.g. to at least 1500° C.), in a reducing atmosphere (such as hydrogen), to give an inorganic material comprising tungsten carbide containing cobalt. A heating rate of not more than 50° C./hour until 900° C. is reached is preferred. The weight ratio of tungsten carbide to cobalt (as metal) is preferably from 8:1 to 12:1.

As the liquid mixture is formed into droplets before being contacted with the precipitating agent the gel precipitate is in the form of gel particles or droplets which can be subsequently heated to produce balls of inorganic material containing tungsten carbide. The liquid mixture can be formed into droplets by a variety of methods, for example by a gravity drop-forming method (wherein the liquid mixture is dripped through an orifice) or by use of a vibrating jet, or a vibrating spinnerette, as disclosed for example in British Patent Specification Nos. 1,395,486 and 1,401,962.

Thus in accordance with one particular embodiment the present invention provides a process for the production of balls (which may approach the shape of spheres) of tungsten carbide containing cobalt, which process comprises forming a liquid mixture containing tungsten carbide powder, aqueous cobalt nitrate solution and guar gum into droplets, contacting the droplets preferably for a period not exceeding 1 hour, more preferably not exceeding 20 minutes, with a base to form balls of gel precipitate containing tungsten carbide, cobalt hydroxide and organic agent, and heating the balls of gel precipitate under conditions such that balls of tungsten carbide, containing cobalt, are formed. The balls are preferably heated, to avoid cracking, in a vessel having a thermal conductivity not exceeding 1000 cal/sec/cm$^2$, more preferably not exceeding 300 cal/sec/cm$^2$, such as alumina and not graphite or molybdenum. The time of contact matters because some bases (e.g. NaOH) tend to leach out cobalt.

While it is normally unusual, we have found that it is advantageous from the point of view of forming gel precipitated spheres of cobalt containing tungsten carbide that the liquid mixture also contains the unusual additive of a wetting agent. Here, too, many wetting agents had to be rejected because they reacted with the dissolved inorganic species, and a non-ionic wetting agent requiring no buffering is preferred.

Spheres containing tungsten carbide together with cobalt prepared in accordance with the present invention can have a diameter of 0.8 to 0.9 mm and thus are suitable for use as ball-point pen ball "blanks" (i.e. spheres suitable for final grinding and polishing to produce balls for ball-point pens). Conventionally pressed tungsten carbide pen ball blanks have a larger diameter and require correspondingly more grinding, which is costly.

When it is desired to produce a high density inorganic material comprising tungsten carbide and cobalt, we prefer that heating is continued after the organic substance is removed to cause sintering of the tungsten carbide and cobalt.

The invention in another aspect also provides a ball of an inorganic material containing tungsten carbide, whenever prepared by a process in accordance with the invention.

The invention will now be further illustrated by way of example only as follows:

EXAMPLE

In this Example there is described the preparation of spheres of tungsten carbide containing about 8% cobalt suitable for use as blanks for preparing ball-point pen balls.

A liquid mixture was prepared as follows: 16.5 mls water and 0.17 grams of "Supercol U" (a guar gum, described later) were throughly stirred together and subsequently 0.1 grams of Triton X100 (a wetting agent, described later) and 2.5 grams of Co $(NO_3)_2.6H_2O$ were added and throughly mixed by stirring. Subsequently to this liquid mixture was added 6.12 grams of tungsten carbide powder (particle size approximately 0.2 microns) and the mixture stirred for approximately 15 minutes to promote wetting and dispersion of the powder. This resulting liquid mixture (which was a slurry of total volume 20 mls) was placed in a container and sealed, and allowed to de-aerate overnight.

The de-aerated liquid mixture was subsequently stirred again for an hour at a low speed sufficient to promote homogeneity, but to avoid aeration.

Subsequently the liquid mixture was fed through a plurality of PTFE jets (one millimeter diameter) to form droplets for gelling.

Gelling was accomplished by using 400 mls of aqueous sodium hydroxide solution (8N) containing a surfactant (dodecylbenzenesulphonic acid 0.25%) through which air was bubbled in order to produce a 5 centimeter foam layer above the surface of the sodium hydroxide solution.

The arrangement was such that droplets of liquid mixture fell from the PTFE jets at the rate of approximately one droplet per second per jet and dropped through an 8 centimeter air gap before descending through the 5 centimeter layer of foam and ultimately passing into 9 centimeters of the 8N aqueous sodium hydroxide solution. Provision of the foam layer reduces the risk of deformation of the droplets on contact with the surface of the sodium hydroxide solution, as disclosed in British Patent Specification No. 1,401,962.

The droplets were allowed to remain in the sodium hydroxide solution for approximately 15 minutes in order to form gel precipitate particles and then were washed in demineralised water to neutrality.

The washed gel precipitate particles were dried in a current of air at ambient temperature, were subsequently placed in alumina boats and loaded into a graphite tube furnace.

Prior to heating the furnance was evacuated to a pressure of approximately 0.04 torr and returned to atmospheric pressure using argon. Heating then commenced under a flow of 4% hydrogen in argon and a maximum temperature of 1500° C. was reached in 1¼ hours. (1520° C. after 1½ hours is also satisfactory). This temperature was held for 20 minutes and the furnace then allowed to return to ambient temperature over a period of approximately 3 to 4 hours. A slight improvement in the product strength could, if desired, be obtained by heating to 1500° C. or 1520° C. at a rate which did not exceed 50° C./hour until 900° C. was reached.

On unloading the furnace it was found that the gel precipitate particles had been converted to substantially (i.e. 4% oblateness) spherical particles having a density of 13.75 g/cm$^3$ (i.e. 92% of theoretical density) of tungsten carbide containing 8.14% cobalt. A sample of these particles was taken for compressive strength measurement which was carried out by placing sample particles between two anvils and applying hydraulic pressure until the crushing point was reached. It was found that the average crushing strength of the particles was 125 lbs. The mean diameter was 0.85 mm with a standard deviation of 2%.

It will be appreciated that the heating was used to achieve (a) removal of organic material, (b) reduction of the cobalt hydroxide to cobalt metal and (c) sintering of the tungsten carbide and cobalt to give strength.

Supercol and Triton are both trade marks: "Supercol U" is a purified form of guar gum which is a unique polysaccharide consisting of a chain of mannose units branched with galactose units on alternate mannose units.

Triton X100 is a non-ionic wetting agent, being the product of the condensation reaction of ethylene oxide with alkyl phenol.

We claim:

1. A process for producing balls of cobalt containing tungsten carbide, the process comprising forming droplets of a liquid mixture comprising: particles of tungsten carbide; guar gum; a dissolved cobalt salt; and a non-ionic wetting agent; contacting the droplets for not more than 1 hour with a base to precipitate a cobalt species, thereby forming droplets of a gel precipitate, placing the droplets of the gel precipitate in a vessel having a thermal conductivity not exceeding 100 cal/sec/cm$^2$, and heating the vessel in a reducing atmosphere to remove the guar gum and to sinter the tungsten carbide and cobalt, thereby forming sintered balls of cobalt containing tungsten carbide.

2. The process of claim 1, wherein the droplets of the liquid mixture are dropped into the base through a cushioning layer of a foam formed by alkyl aryl sulphonic acid in a concentration of 0.1% to 0.5%.

3. The process of claim 1, wherein the vessel is of alumina.

4. The process of claim 1, wherein the heating is to at least 1500° C.

5. The process of claim 4, wherein the heating rate is not more than 50° C./hour until 900° C. is reached.

6. The process of claim 1, wherein the weight ratio of tungsten carbide to cobalt (as metal) is from 8:1 to 12:1.

7. The process of claim 1, further comprising grinding and polishing the sintered balls and assembling the ground and polished balls into the points of ball-point pens.

* * * * *